Aug. 20, 1929.  M. F. CARR  1,725,179
LUBRICATING SYSTEM
Filed Aug. 25, 1925
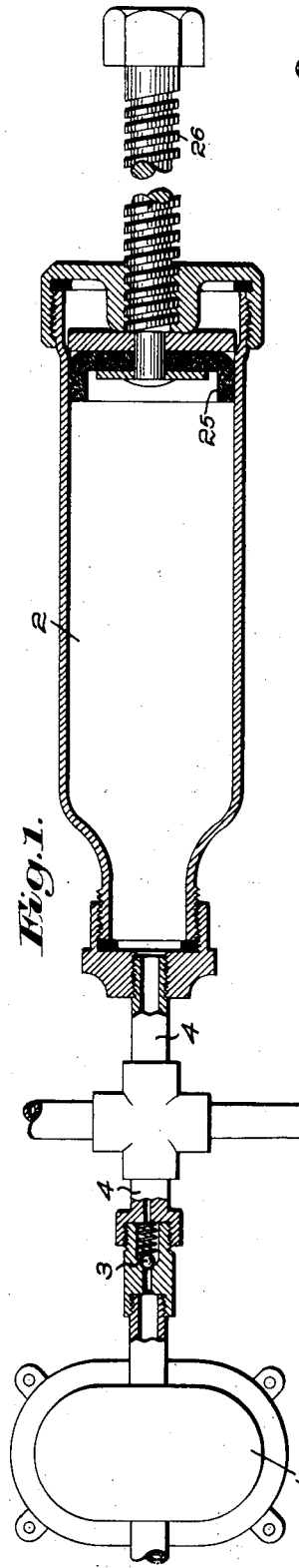
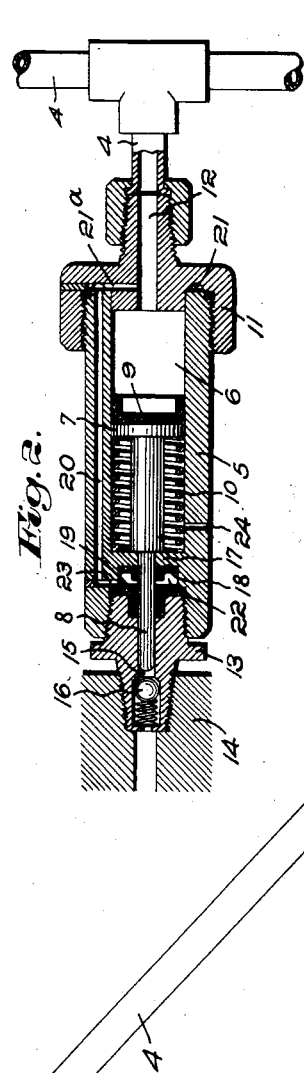
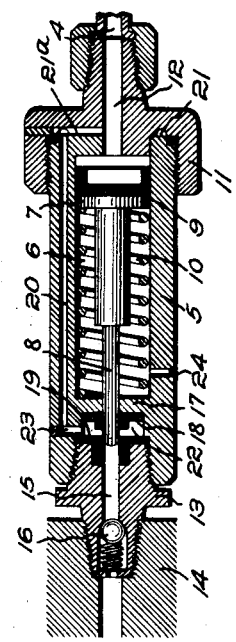
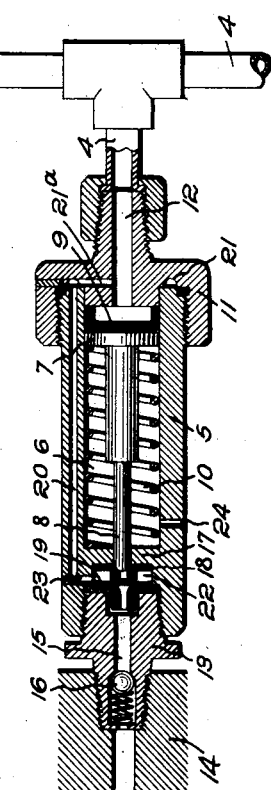
Inventor:
Moses F. Carr,
by Emery Booth Janney Varney
Attys Patented Aug. 20, 1929.

1,725,179

UNITED STATES PATENT OFFICE.

MOSES F. CARR, OF LEXINGTON, MASSACHUSETTS, ASSIGNOR, BY MESNE ASSIGNMENTS, TO ALEMITE CORPORATION, OF CHICAGO, ILLINOIS, A CORPORATION OF DELAWARE.

LUBRICATING SYSTEM.

Application filed August 25, 1925. Serial No. 52,325.

This invention aims to provide an improved pressure lubricating system.

In the drawings which illustrate a preferred embodiment of my invention:—

Figure 1 is a general layout of a portion of the system, being partly in elevation and partly in section;

Fig. 2 is a section through one of the lubricant measuring and expelling cups showing the lubricant being expelled therefrom under relatively high potential pressure; and Fig. 3 is a section of the cup showing the relative location of the parts as the supply of lubricant to the high pressure chamber is cut off.

Referring to the drawings, I have shown a so called central lubricating system particularly, though not exclusively, useful for lubricating the bearings of motor vehicles. The system in general, with the exception of the charge determining devices or cups, (only one of which is illustrated in the drawings), is substantially the same as shown and described in my copending application, Serial No. 52,326, filed herewith.

The pump 1, the barrel 2, the check valve 3 and the connecting pipes or conduits 4, are similar to those more fully described in the above mentioned application.

Referring now to the charge determining pressure multiplying cups which are located adjacent to, or connected directly to, each bearing to be lubricated, I have shown a cylinder 5, presenting a relatively long chamber 6, in which is located a piston 7, to which is secured a plunger 8. A cup leather 9, or the like, is located forwardly of the piston 7 to prevent lubricant from leaking past the piston, which is normally urged toward the inlet end of the chamber 6 by a spring 10. A removable head 11 is secured to the inlet end of the cylinder 5 and provided with a passage 12 connecting the chamber 6 with a conduit 4, through which lubricant may be supplied to the cup. To the discharge end of the cylinder 5 is secured a part 13, which is shown as secured directly to a bearing 14. This part 13 presents a chamber 15 of relatively small cross sectional area normally closed at its discharge end by a spring pressed ball check 16 to prevent passage of lubricant to the bearing except when forced from the chamber under high pressure. The chambers 6 and 15 are separated by a wall 17 which also provides a bearing for the plunger 8. Between the wall 17 and the chamber 15 I have provided two hat washers 18 and 19. The hat washer 18 prevents leakage of the lubricant around the plunger 8 back into the chamber 6 (Fig. 1), while the washer 19 prevents leakage of lubricant around the plunger 8 during the time when lubricant is being forced from the chamber 15, as illustrated in Fig. 2.

A bypass connecting the chamber 6 to the chamber 15 is provided by drilling a passage 20 parallel with the chamber 6 in the wall of the cylinder 5. One end of this passage 20 communicates with a groove 21, which is connected to the passage 12 by a passage 21ᵃ. The other end of the passage 20 is connected to the space 22, between the hat washers 18 and 19, by a passage 23, as shown in the drawings.

A vent 24 is provided at one side of the cylinder 5 to permit escape of any lubricant which may find its way into the chamber 6 past either the cup leather 9 or the hat washer 18.

In normal operation, the system is supplied with lubricant under relatively low pressure from the pump 1. The lubricant flows past the check valve 3 to the cups and to the barrel 2 through the conduits 4. The piston 25 in the barrel 2 is normally located at the outer end of the barrel (Fig. 1) so that the barrel may be filled with lubricant after the chamber 15 in each cup has been filled. The pressure of the lubricant supplied by the pump 1 is not sufficient to open the ball checks 16 and therefore the entire system becomes filled with lubricant so that when it is desirable to supply lubricant to the bearings the operator merely turns the piston stem 26 extending through the barrel 2, thereby forcing the piston toward the discharge end of the barrel. This action builds up the pressure of the lubricant to a point where the pressure in the entire system is sufficient to overcome the pressure of the spring 10 in each cup, thereby forcing the piston 7 forward in the chamber 6, as shown in Fig. 3. The plunger 8, being connected to the piston 7, is also urged forward so that it may pass through the cup leather 19 and cut off further supply of lubricant to the chamber 15, as illustrated in Fig. 3. A measured quantity of lubricant then lies between the ball check 16 and the end of the plunger 8 and this may be forced from the chamber 15 to the bearing at a greatly increased potential pressure over the pressure required to operate the pistons 7. By this method of lubricating each bearing from individual cups, a predetermined quantity of lubricant may be forced to each bearing by applying pressure to the lubricant from a centrally located point.

The volume of lubricant in the barrel 2 is slightly more than the combined volume of all of the cups, thereby assuring positive operation of each cup. During the operation of forcing the lubricant from the chambers 15, the pressure of the lubricant closes the check valve 3, so that the pressure of the lubricant will not be reduced by escape to the pump 1.

The cross-sectional area of the chamber 15 is so small in comparison with the area of the piston 7 that lubricant may be forced to the bearing at a pressure which is sufficiently high to dislodge dirt etc. from the average clogged or tight bearing.

After the piston 25 in the barrel 2 has been forced toward the discharge end of the barrel as far as possible, it is thereafter retracted to release the pressure and permit the springs 10 in the cups to return the plungers 8 and the pistons 7 to their normal positions as shown in Fig. 1. During the return stroke of the plunger 8 in the cup the ball check 16 closes and prevents the lubricant in the bearing from being drawn back into the chamber 15 by suction created by the plunger. The pump 1 then operates to refill the cups and the barrel 2 in the same manner as hereinbefore described.

While I have shown and described a preferred embodiment of my invention, it will be understood that changes involving omission, alteration, substitution and reversal of parts and even changes in the mode of operation may be made without departing from the scope of my invention, which is best described in the following claims.

Claims:

1. A lubricating system comprising, in combination, a lubricant measuring device including a cylinder, a piston located in said cylinder, a charge determining chamber beyond said cylinder, a plunger operable with said piston, means for normally supplying lubricant under relatively low pressure to said chamber and means for supplying lubricant under a relatively higher pressure to said cylinder, thereby to operate said piston, which in turn operates said plunger, to cut off the supply of lubricant to said chamber and force a predetermined quantity of lubricant therefrom.

2. A lubricating system comprising, in combination, a charge determining and pressure multiplying lubricant device including a cylinder, a piston located in said cylinder, a chamber beyond said cylinder having a substantially smaller cross-sectional area than the cross-sectional area of said cylinder, and a plunger for operation in said chamber, low pressure pump means for supplying lubricant to said chamber and high pressure pump means operable to cause the pressure of the lubricant to move said piston thereby to force said plunger into said chamber to expel the lubricant therefrom under a relatively high potential pressure.

3. A lubricating system comprising, in combination, a charge determining and pressure multiplying lubricant device including a cylinder, a piston located in said cylinder, a chamber beyond said cylinder having a substantially smaller cross-sectional area than the cross-sectional area of said cylinder, and a plunger for operation in said chamber, low pressure pump means for supplying lubricant to said chamber and high pressure pump means operable to cause the pressure of the lubricant to move said piston thereby to force said plunger into said chamber to cut off the supply of lubricant thereto and to expel the lubricant therefrom under a relatively high potential pressure.

4. A lubricating system comprising, in combination, a charge determining and pressure multiplying lubricant device including a cylinder, a piston located in said cylinder, a chamber beyond said cylinder having a substantially smaller cross-sectional area than the cross-sectional area of said cylinder, a plunger for operation in said chamber, low pressure pump means for supplying lubricant to said chamber and high pressure pump means operable to cause the pressure of the lubricant to move said piston thereby to force said plunger into said chamber to cut off the supply of lubricant thereto and to expel the lubricant therefrom under a relatively high potential pressure, and valve means for preventing return of lubricant to said chamber during the return stroke of said piston and said plunger.

5. A lubricating system comprising, in combination, a charge determining and pressure multiplying lubricant device including a cylinder, a piston located in said cylinder, a chamber beyond said cylinder having a substantially smaller cross-sectional area than the cross-sectional area of said cylinder, and a plunger carried by said piston for operation in said chamber, low pressure pump means for supplying lubricant to said chamber and separate high pressure pump means operable to cause the pressure of the lubricant to move said piston thereby to force said plunger into said chamber to expel the lubricant therefrom under a relatively high potential pressure.

6. A lubricating system comprising, in combination, a charge determining cup for supplying a predetermined quantity of lubricant to a bearing, a pump for supplying lubricant to said cup, a check valve between the cup and the bearing to prevent direct passage of the lubricant from the pump to the bearing at low pressures and lubricant operated high pressure plunger means for forcing the lubricant from said cup past said check valve.

7. A lubricating system comprising, in combination, a charge determining cup having a chamber of relatively small cross-sectional area, a plunger for forcing the lubricant from said chamber at a high pressure, a low pressure pump for supplying lubricant to said chamber through a conduit connecting said pump and said cup, a valve at the outlet end of said chamber for preventing direct passage of the lubricant from the pump to a bearing at low pressures and a high pressure pump for hydraulically actuating said plunger.

8. A lubricating system comprising, in combination, a charge determining pressure multiplying cup having two chambers, one of said chambers substantially smaller in cross-sectional area than the other chamber, a plunger for forcing the lubricant from the small chamber, a piston in the larger chamber for operating the plunger and a bypass through which lubricant may normally flow from the larger chamber to the smaller chamber, a low pressure pump for supplying lubricant to the system, a barrel adapted to be filled with lubricant by said pump, a high pressure piston in said barrel, conduits connecting all of said parts, a valve at the outlet end of said small chamber to prevent normal flow of lubricant beyond said chamber under the pressure of said low pressure pump and means located in said barrel for compressing the lubricant in the entire system thereby to force said piston and plunger forward to force the lubricant from said small chamber under a relatively high potential pressure.

In testimony whereof, I have signed my name to this specification.

MOSES F. CARR.